United States Patent [19]
Levey

[11] 3,708,908
[45] Jan. 9, 1973

[54] INSECT TRAP
[75] Inventor: John S. Levey, Los Angeles, Calif.
[73] Assignee: Days-Ease Home Products Corporation, Hollywood, Calif.
[22] Filed: June 22, 1970
[21] Appl. No.: 48,153

[52] U.S. Cl. .............43/114, 43/115, 43/122, 229/37 R
[51] Int. Cl. .............................A01m 01/14
[58] Field of Search..........43/114, 115, 121, 122; 229/39 B, 37 R, 23 R

[56] References Cited

UNITED STATES PATENTS

| | | | |
|---|---|---|---|
| 1,186,178 | 6/1916 | French | 43/131 |
| 518,898 | 4/1894 | Schmidt | 229/37 R |
| 2,826,350 | 3/1958 | Marx | 229/37 R |
| 1,985,579 | 12/1934 | Reich | 229/29 B |
| 3,532,263 | 10/1970 | Ross | 229/39 B |
| 1,561,832 | 11/1925 | Corsi et al. | 43/115 |
| 1,225,556 | 5/1917 | Allen | 43/114 |
| 1,715,173 | 5/1929 | Opitz | 43/121 X |
| 2,796,696 | 6/1957 | Kea | 43/121 |
| 420,490 | 2/1890 | Barnard | 43/122 |

FOREIGN PATENTS OR APPLICATIONS

| | | | |
|---|---|---|---|
| 241,599 | 12/1911 | Germany | 43/114 |
| 247,653 | 6/1912 | Germany | 43/114 |

Primary Examiner—Aldrich F. Medbery
Assistant Examiner—George Yahwak
Attorney—Allan M. Shapiro

[57] ABSTRACT

The insect trap has a tubular, perforated housing which serves as a receptacle for an inner tubular structure which is an insect attractor and catcher. In the preferred embodiment, the inner tubular structure is also perforated and carries a sticky surface on the exterior thereof for capturing insects and an odor-emitting attractant on the interior for emitting an attractive odor through the perforations. In another embodiment, the odor-emitting attractant may be incorporated into the sticky insect-capturing material and coated on the outside of the inner tubular insert.

23 Claims, 6 Drawing Figures

PATENTED JAN 9 1973

JOHN S. LEVEY
INVENTOR.

BY Allan M. Shapiro
ATTORNEY

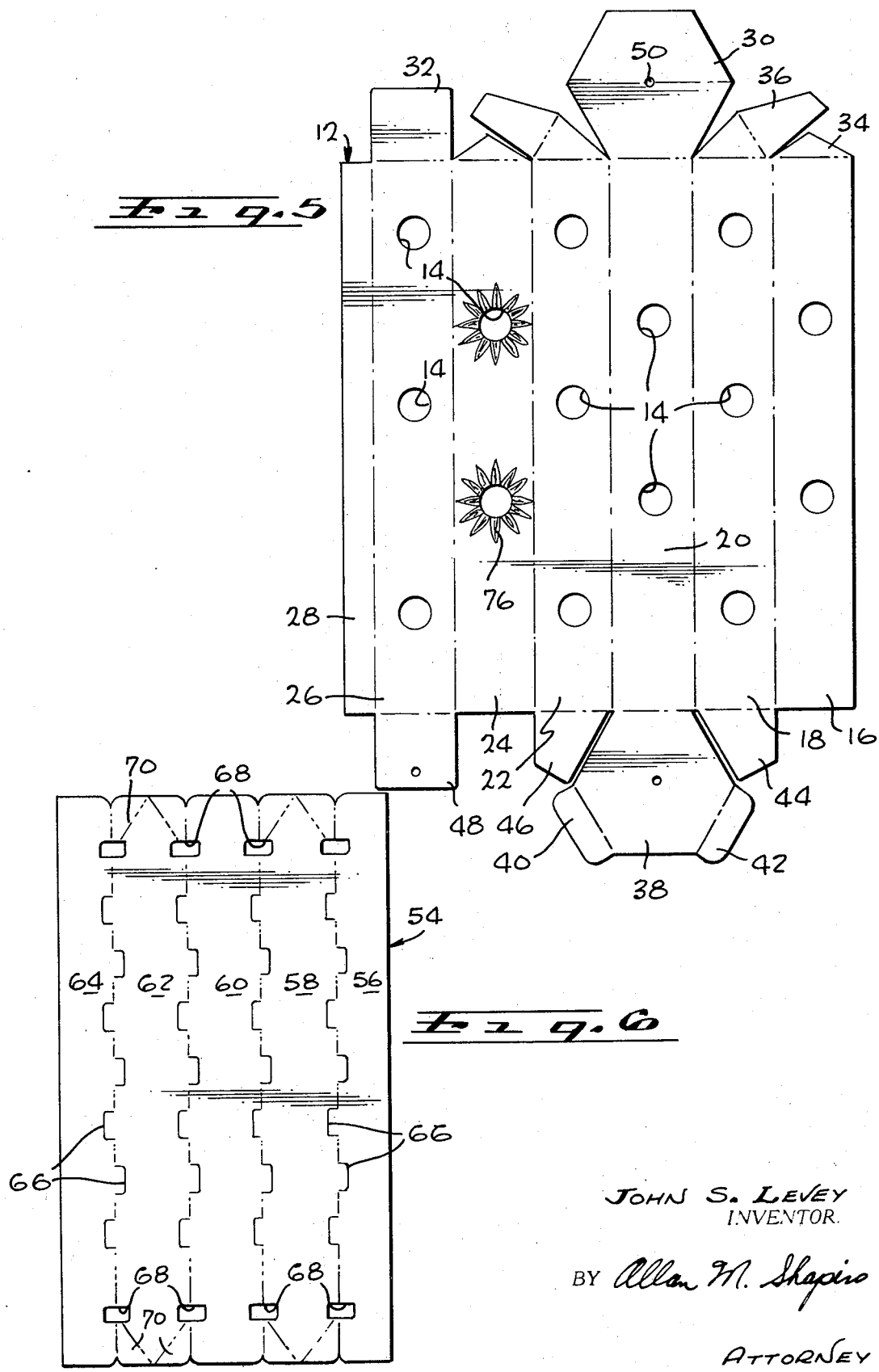

INSECT TRAP

BACKGROUND

1. Field of the Invention

This invention is directed to an insect trap and more particularly to an insect trap which employs adhesive and an odor-emitting insect attractant.

2. The Prior Art

Insects have been a bother to mankind since the dawn of history. Man has recognized that some insects are beneficial while others seem to cause more upset than their particular value in the ecological balance. Flying insects around the house are of particular concern, because they annoy the householder in everyday living. For this reason, there has been a great deal of prior art directed to devices for killing flies and mosquitos. Flypapers have been employed, both in sheets and in suspended tapes. Hanging devices have been found to be effective, for flies appear to prefer resting on such devices. Insect traps employing adhesives and holding flypaper have, thus, been created.

The prior art has been principally effective in producing devices which are visually attractive to insects and incorporate sticky surfaces, so that insects which are attracted thereto are captured. These prior art devices are formed in different shapes, but none has provided an insect trap of good appearance with protected sticky surface and further incorporating an attractive odor-producing substance.

Odor is a more satisfactory attractant for insects than appearance. The complex and rudimentary eye structure of most insects makes the creation of an attractive visual entity for attracting several varieties of insects difficult. However, all insects have a highly-developed olfactory process so that the employment of an odor-producing insect attractant is more efficacious. All insects are attracted to the odor of ammonia and, accordingly, ammonia can be successfully employed for this purpose. The odor level of the ammonia can be sufficiently low as to be unobjectionable in the environment of the insect trap but still sufficiently strong to cause fully-effective insect attracting.

SUMMARY

In order to aid in the understanding of this invention, it can be stated in essentially summary form that it is directed to an insect trap, particularly an insect trap which employs both odor attractant and adhesive to attract and capture insects. The insect trap has an outer tubular perforated housing, in which is positioned a tubular structure which carries an adhesive on the exterior surface thereof. The odor-producing material is preferably positioned interiorly of the tubular structure, in which case that tubular structure is perforated to permit excursion of the odor, but may be alternatively incorporated into the adhesive material on the exterior of the tubular insert.

Accordingly, it is an object of this invention to provide an insect trap which is effective in the attracting and catching of insects, particularly flying insects which are found in and around the home. It is another object to provide an insect trap which incorporates both an adhesive substance and an odor-producing compound, which odor-producing compound attracts flying insects to the adhesive so that the adhesive captures the insects. It is a further object to provide an outer tubular, perforated housing in which is located both the adhesive and odor source, so that they are protected from casual external contact and yet the perforations are sufficiently large to permit the entry of flying insects to the adhesive for insect capture.

It is still another object to provide such an outer tubular perforated housing having external ornamentation thereon, which ornamentation provides greater attractiveness to the human user and is decorated in such a fashion as is believed to be visually attractive to at least some varieties of flying insects. It is still another object to provide an inner tubular structure within such an outer tubular perforated housing, with the adhesive and odor source both associated with the inner tubular insert structure. It is an additional object to provide a perforated inner tubular structure with the odoe source located within the inner structure, so as to permit escape of insect attractive odor. It is a further object to provide an odor source which emits ammonia in vapor form for the attraction of insects. It is still another object to provide an insect trap which is formed of cardstock which is appropriately formed in two blanks and the blanks folded, adhesively secured and assembled to produce an economic insect trap.

The features of the present invention which are believed to be novel are set forth with particularity in the appended claims. The present invention, both as to its organization and manner of operation, together with the further objects and advantages thereof, may be best understood by reference to the following description, taken in conjunction with the accompanying drawings.

BRIEF DESCRIPTION OF THE DRAWINGS

FIG. 5 is a plan view of the blank for the tubular perforated housing, showing the fold lines as dash lines.

FIG. 6 is a plan view of the blank from which the inner tubular insert structure is formed, showing the fold lines as dashed.

DESCRIPTION

Figure 1:
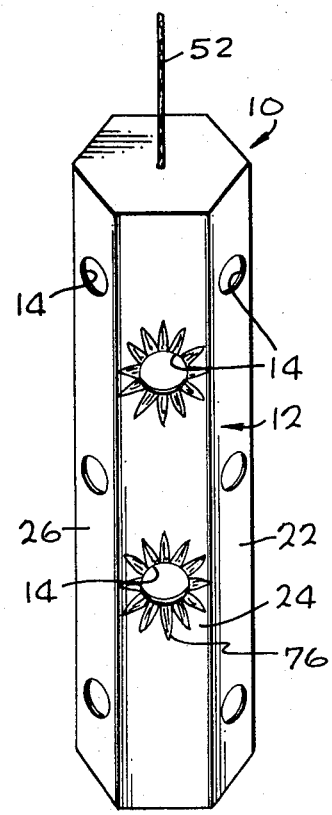
FIG. 1 is a perspective view of the insect trap of this invention in the assembled condition.
Figure 2:
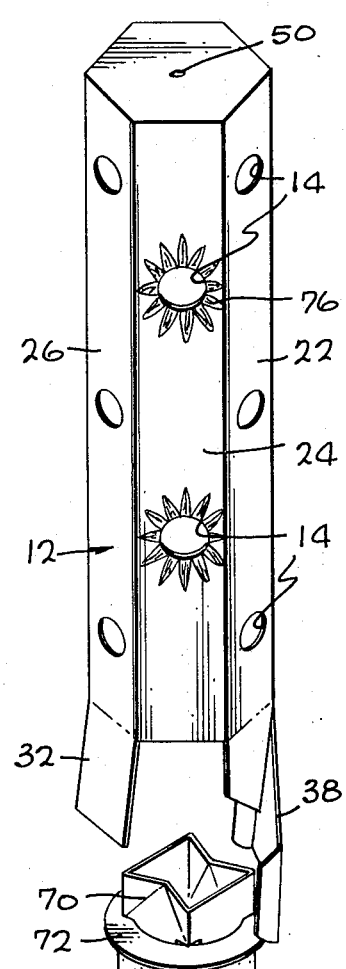
FIG. 2 is an exploded perspective view thereof.
Figure 3:
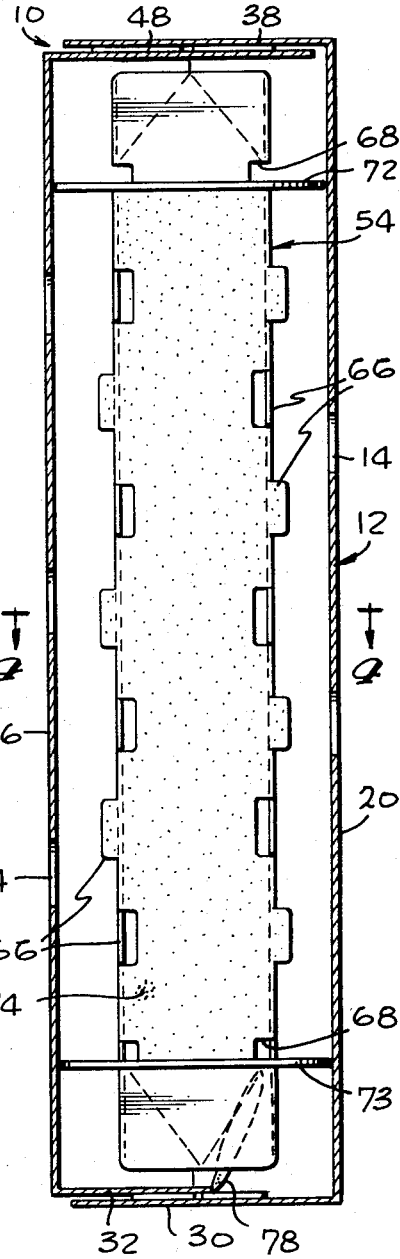
FIG. 3 is an enlarged vertical section of the insect trap of FIG. 1, shown partly in section and partly broken away.
Figure 4:
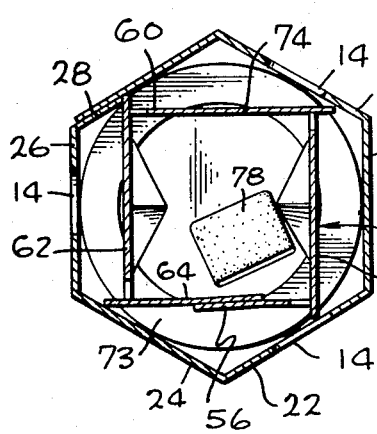
FIG. 4 is a transverse section taken generally along the line 4—4 of FIG. 3.

The insect trap of this invention is generally indicated at 10 in FIGS. 1 and 2. The insect trap 10 comprises an outer tubular housing 12. The housing 12 has an outer surface which is the side seen by the observer when the insect trap is in use. A plurality of holes or perforations 14 are formed through the side walls of the tubular housing 12.

Outer tubular perforated housing 12 can be formed in any convenient manner which results in a tube having the function and utility hereinafter described. It is conveniently and inexpensively made of paper board stock, cut into a suitable blank and having score lines thereon for aid in folding the blank into the tubular configuration. The blank of FIG. 5 is a blank which can be made up into a tube having six sides. The hexagon is uniform in the preferred embodiment illustrated, but it is clear that any number of sides which provide a hollow interior is suitable. The blank in FIG. 5 makes up into the hexagonal tube and, thus, has six side wall panels 16, 18, 20, 22, 24 and 26. In addition, adhesive flap 28 is formed thereon for securing the side walls into the hexagonal configuration. The side wall panels 16 through 26 are separated by scored fold lines so that the blank structure can be conveniently folded with the adhesive flap 28 overlapping panel 16. They are adhesively secured together.

In the blank of outer tubular housing 12 illustrated in FIG. 5, each of the side wall panels at the top of the blank carries a suitable flap thereon. Top flap 30 is secured to panel 20 and is of hexagonal shape of such dimension as to substantially cover the entire top of outer housing 12 when it is in its hexagonal tubular shape. Flap 32 is integrally formed with panel 26 and is adhesively secured to top flap 30. This arrangement limits the maximum distance between panels 20 and 26. The panels 20 and 26 may be folded face-to-face by means of the fold line on top flap 30, when the side wall panels 16 and 18 are folded along the line therebetween to lie next to each other, at the same time panels 22 and 24 fold along the line therebetween to lie next to each other. Thus, the hexagonal tubular structure can be folded flat.

Similarly, flaps 34 and 36 are formed along the top edges of side wall panels 16 and 18. Symmetrically identical flaps are also formed on the tops of side wall panels 22 and 24. When the outer housing 12 is in its hexagonal form, flaps 34 and 36 are adhesively secured together to limit the maximum angular opening between the panels 16 and 18. However, in view of the scored fold line on flap 36, panels 16 and 18 can be folded so they lie against each other, as previously described. By this means, all of the flaps on the tops of the panels will permit the tubular housing to either assume a flat configuration or permit it to be opened up into the hexagonal configuration illustrated in FIGS. 1 through 4.

Hole 50 is formed in top flap 39 to permit the installation of cord 52 for the hanging of trap 10.

The flaps arranged on the bottoms of the panels 16 through 26 are of different configuration so that they may be opened or closed in the manner common in paper board box construction so that the inner tubular space can be reached. Furthermore, the flaps on the bottoms of the panels are arranged so that, when tubular housing 12 is in its opened, as compared to its folded, flat state and the top flaps are put in place, the tubular housing is held in its open state.

Bottom flap 38 is integrally formed on the bottom of side wall panel 20. Bottom flap 38 is of hexagonal configuration, with one side corresponding to the position of each side wall panel when the housing 12 is in its hexagonal configuration. Bottom flap 38 carries tabs 40 and 42 for entry into the interior of the tube, when the bottom flap 38 is folded down. These tabs 40 and 42, respectively, insert interiorly of panels 24 and 16. Additionally, panels 18 and 22 carry simple inward-folding flaps 44 and 46 to close the joint space between the bottom flap and the side wall panels. Finally, side wall panel 26 carries flap 48 which folds interiorly of bottom flap 38.

By this construction, the bottom of the trap can be opened to permit the insertion of inner tubular insect attractor and catcher structure 54. Structure 54 is a tubular structure, illustrated in the preferred embodiment as being square and being folded from a paper board blank illustrated in FIG. 6. While a tubular structure of square configuration is preferred, as illustrated, any tubular construction which can be placed within housing 12 and spaced from the interior thereof is useful. Thus, the square construction of inner tubular structure 54 is illustrative of the preferred embodiment. As shown in FIG. 6, tubular structure 54 is comprised of four side panels 56, 58, 60 and 62. In addition, flap 64 is integrally formed therewith for overlap with adhesive securement to side panel 56, in order to form the tube. In addition to score lines between the side panels, in order to aid in folding therebetween, cut notches are made therein, directly adjacent the folding score lines. These notches are U-shaped cuts, as illustrated at 66. The notches are alternately arranged on opposite sides of the fold score lines, with the result that tabs extend beyond the fold lines to produce openings along the fold score lines. These are particularly well-shown in the perspective view in FIG. 2.

Corner cutouts 68 are provided at each end of the structure 54. Beyond the cutouts, the panels 58 and 62 are provided with scored fold lines 70 which permit the ends of the opposite panels 56 and 62 to be brought together in a point, as is shown at the bottom of FIG. 2. Spacer washers 72 and 73 have an interior diameter such as to fit within the interior of notches 68. Thus, when the ends of structure 54 are made pointed, the spacer washers can be snapped into their respective sets of notches. The bottom spacer washer 73 is illustrated as being ready to snap into place in FIG. 2, while the upper spacer washer 72 is already positioned.

The exterior diameter of the spacer washers 72 and 73 is such as to fit within the interior of outer tubular housing 12. The spacer washers maintain the exterior surface of the inner tubular insect attractor and catcher structure from contacting the inner surface of the outer tubular housing 12. As shown in FIG. 2, the inner structure can be readily inserted into the bottom of the outer tube, whereupon the bottom flaps of the outer tube are closed to maintain the tubes together.

The outer surface of the inner tubular insect catcher 54 is coated with a sticky, tacky adhesive substance 74. As is well-known in the flypaper art, an adhesive which maintains sufficient tacky adhesiveness to catch flies by their feet can be economically prepared and conveniently applied. Such a well-known tacky adhesive is employed as adhesive 74. The openings 14 in the outer housing are sufficiently large as to permit the entry of flies and other such flying insects into the interior of housing 12 so that they can come into physical contact with the adhesive 74. One means which is both decorative and believed to attract insects comprises the printing of flower petals 76 around the openings 14. Such flower petals may attract flies and other insects. Additionally, or alternatively, the exterior surface of the tubular housing 12 can be covered with other designs which are ornamental and, hopefully, insect attractive.

An odoriferous attractant containing or producing ammonia is also provided. The faint odor of ammonia is the universal attractant for all kinds of flying insects. Thus, a bag 78 containing a chemical compound which continuously gives off a faint ammonia odor is provided. As illustrated, the bag 78 is of porous construction and is preferably made of porous paper. Any convenient air-evaporating ammonia source is useful and such chemical compounds are well-known in the chemical arts. For example, ammonium carbonate breaks down fairly rapidly to produce ammonia. Similarly, urea breaks down to produce ammonia, albeit slowly except in the presence of bacteria. The ammonia odor originates within the interior of inner tubular structure 54 and comes out of the holes formed at notches 66. Thus, the door is directly adjacent the adhesive surface 74 for maximum effectiveness in insect catching.

When the attractant is contained in a porous paper bag and is continuously operative in an ordinary atmosphere, care must be taken to prevent loss of the odor between manufacturing and placing the insect trap in final use. This can be accomplished by wrapping the entire insect trap 10 in an impervious wrapper. Equilibrium is rapidly build up within the wrapper to prevent odor loss. When the exterior wrapper is removed so that the insect trap can be used, evaporation continues.

Another method is to provide the attractant bag 78 in its own special outer wrapper, with the user unwrapping the bag 78 when ready for use. This outer wrapper is, of course, odor impervious so that loss of odor is prevented until the bag 78 is unwrapped and placed in position, as illustrated. In still another manner of placement, a bag of odoriferous attractant can be opened and poured into the bottom of housing 12, through any one of the side holes 14. In the bottom of housing 12, the odor would rise up through the interior of structure 54 to come out of the holes and notches 66.

In still another construction, the odoriferous attractant compound can be incorporated into adhesive 74, so that the insects are directly attracted to the adhesive. In such a case, wrapping of the entire structure after manufacture until use is essential to prevent loss of the odor. In either construction, the attractant odor should have a sufficiently long life that, in the average environment, the odor will last as long as there is any adhesive surface on which the insect can attach himself.

Another method is to provide the attractant bag 78 in in the form of a closed container adapted to be pierced as by a pin for gradual release of the attractant odor through the hole or holes produced by the pin.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An insect trap being formed from an exterior paperboard blank forming the exterior thereof and an interior paperboard blank forming the interior thereof, said exterior blank comprising a plurality of substantially rectangular side wall panels, said panels being successively joined along fold lines, and an adhesive flap on the last of the joined side wall panels for adhesive securement to the first of the side wall panels for the formation of an exterior tube;

a plurality of holes in said side wall panels, said holes being of sufficient size as to permit a housefly to pass therethrough;

first and second top flaps on first and second non-adjacent side wall panels for adhesive securement together to limit the separation distance between said first and second side wall panels;

top flaps on adjacent side wall panels, said top flaps on adjacent side wall panels being adhesively securable together to limit the maximum angular opening of said adjacent side wall panels so that said side wall panels may be folded flat and may be opened to a polygonal tube;

said interior blank being formable as an inner structure for insertion into the housing formed from said exterior blank, said interior blank comprising:

a plurality of side panels adjoining each other along fold lines, including a flap laterally positioned with respect to the end fold line for adhesive securement on the first side panel for the formation of a tube;

a plurality of non-linear cuts joining each of said fold lines so that folding of adjacent side panels along said fold lines produces openings and extended tabs at each of said non-linear cuts; and corner cutouts formed in said interior blank on said fold line adjacent each end of said side panels, and fold lines extending from said corner cutouts to the ends of said side panels for installation of a spacer ring in said corner cutouts.

2. The blank of claim 1 wherein said non-linear cuts are alternately formed on opposite sides of said fold lines and such cuts are arranged along a plurality of said fold lines.

3. Interior and exterior paperboard blanks for forming an insect trap therefrom, said exterior paperboard blank comprising:

six substantially rectangular side wall panels, said panels being successively joined along fold lines, and an adhesive flap on the last of the joined side wall panels for adhesive securement to the first of the side wall panels for the formation of a hexagonal tube;

a plurality of holes in said side wall panels, said holes being of sufficient size as to permit a housefly to pass therethrough;

first and second top flaps on first and second non-adjacent side wall panels for adhesive securement together to limit the separation distance between said first and second side wall panels;

top flaps on adjacent side wall panels, said flaps on adjacent side wall panels being adhesively securable together to limit the maximum angular opening of said adjacent side wall panels so that said side wall panels may be folded flat and may be opened to a hexagonal tube;

bottom flaps formed on the opposite end of said side wall panels from said top flaps, said bottom flaps including a polygonal bottom flap having first and second tabs therein and flaps on said side wall panels adjacent said panels having said bottom flap thereon so that, when said blank is formed into its hexagonal condition, said bottom flap can be positioned to place its tabs within side wall panels;

said interior blank comprising:

a plurality of side wall panels adjoining each other along fold lines, including a flap laterally positioned with respect to the end fold line for adhesive securement on the first side panel for the formation of an interior tube;

a plurality of non-linear cuts joining each of said fold lines so that folding of adjacent side panels along said fold lines produces openings and extending tabs at each of said non-linear cuts;

corner cutouts formed on the fold lines adjacent each end of said side panels, and additional fold lines extending from said corner cutouts to the ends of said side panels so that said side panels can be folded for the installation of a spacer ring in said corner cutouts.

4. An insect trap comprising:

a perforated tubular outer housing;

an inner tubular structure positioned within said housing and spaced from the interior surface thereof over a substantial part of its length, said tubular inner structure being formed of a paperboard blank having a plurality of adjacent side panels adjoined along fold lines, non-linear cuts through said tubular inner structure adjacent said fold line so that, in tubular configuration, said tubular inner structure has a plurality of openings and tabs along said fold lines;

a tacky adhesive on the exterior of said tubular inner structure for the adhesive attachment of insects which enter through the perforations in said tubular outer housing and touch said tacky adhesive on said tubular inner structure;

attractant odor-producing means positioned within said tubular outer housing for emitting insect-attracting odor adjacent said adhesive surface and out of said perforations in said tubular outer housing so that flying insects are attracted by odor through said perforations in said tubular outer housing toward said adhesive.

5. The insect trap of claim 4 wherein said tubular inner structure is perforated and said odor-producing means is positioned within said tubular inner structure to permit odor to escape from the interior to the exterior of said tubular inner structure and thence through said perforations in said tubular outer housing.

6. The insect trap of claim 5 wherein said tubular outer housing and said tubular inner structure are each formed from flat paper board stock and are folded and secured into tubular configuration.

7. The insect trap of claim 6 wherein said tubular outer housing has a plurality of adjoining substantially planar side wall paper board panels to form a polygonal tube, said perforations being positioned in said side wall panels.

8. The insect trap of claim 7 wherein printed figures on the exterior of said side wall panels adjacent said perforations through said side wall panels are formed to represent structures which tend to be visually attractive to flying insects.

9. The insect trap of claim 4 wherein said odor-producing means is positioned within said tubular inner structure within a porous bag within said tubular inner structure.

10. The insect trap of claim 9 wherein corner cutouts are formed along the corners on said fold lines between said side panels of said tubular inner structure and a spacer washer is positioned around each end of said tubular inner structure in said corner cutouts, said spacer washer engaging the interior of said tubular outer housing to space said tubular inner structure from said tubular outer housing.

11. The insect trap of claim 10 wherein said tubular outer housing and said tubular inner structure each formed from flat paper board stock and are folded and secured into tubular configuration.

12. The insect trap of claim 11 wherein said tubular outer housing has a plurality of adjoining substantially planar side wall paper board panels to form a polygonal tube, said perforations being positioned in said side wall panels.

13. The insect trap of claim 12 wherein printed figures on the exterior of said side wall panels adjacent said perforations through said side wall panels are formed to represent structures which tend to be visually attractive to flying insects.

14. An insect trap comprising:

an outer housing having perforations therein of sufficient size to permit a housefly to pass therethrough;

An inner tubular structure perforated generally throughout its length and positioned within said housing and spaced from the interior surface thereof over a substantial part of its length;

a tacky adhesive on the exterior of said tubular inner structure for the adhesive attachment of insects which enter through the perforations in said tubular outer housing and touch said tacky adhesive on said tubular inner structure;

attractant odor-producing means positioned within and at one end only of said tubular inner structure for emitting insect-attracting odor through said perforations in said tubular inner structure to a position adjacent said adhesive surface on the exterior of said tubular inner structure and out of said perforations in said tubular outer housing so that flying insects are attracted by odor through said perforations in said tubular outer housing toward said adhesive.

15. The insect trap of claim 14 wherein said tubular outer housing and said tubular inner structure are each formed from flat paperboard stock and are folded and secured into tubular configuration.

16. The insect trap of claim 15 wherein said tubular outer housing has a plurality of adjoining substantially planar side wall paperboard panels to form a polygonal tube, said perforations being positioned in said side wall panels.

17. The insect trap of claim 16 wherein printed figures on the exterior of said side wall panels adjacent said perforations through said side wall panels are formed to represent structures which tend to be visually attractive to flying insects.

18. An insect trap comprising:

an outer housing having perforations therein of sufficient size to permit a housefly to pass therethrough;

a perforated inner tubular structure formed on a blank of paperboard structure having a plurality of adjacent side panels adjoined along fold lines, non-linear cuts through said tubular inner structure adjacent said fold lines so that, in tubular configuration, said tubular inner structure has a plurality of openings and tabs along said fold lines, and said inner tubular structure being positioned within said housing and spaced from the interior surface thereof over a substantial part of its length;

a tacky adhesive on the exterior of said tubulr inner structure for the adhesive attachment of insects which enter through the perforations in said tubular outer housing and touch said tacky adhesive on said tubular inner structure;

attractant odor-producing means positioned within said tubular inner structure for emitting insect-attracting odor through said perforations in said tubular inner structure to a position adjacent said adhesive surface on the exterior of said tubular inner structure and out of said perforations in said tubular outer housing so that flying insects are attracted by odor through said perforations in said tubular outer housing toward said adhesive.

19. The insect trap of claim 18 wherein
said odor-producing means is positioned within a porous bag within said tubular inner structure.

20. The insect trap of claim 19 wherein
corner cutouts are formed along the corners on said fold lines between said side panels and said tubular inner structure and a spacer washer is positioned around each end of said tubular inner structure in said corner cutouts, said spacer washer engaging the interior of said tubular outer housing to space said tubular inner structure from said tubular outer housing.

21. The insect trap of claim 20 wherein
said tubular outer housing and said tubular inner structure each formed from flat paperboard stock are folded and secured into tubular configuration.

22. The insect trap of claim 21 wherein
said tubular outer housing has a plurality of adjoining substantially planar side wall paperboard panels to form a polygonal tube, said perforations being positioned in said side wall panels.

23. The insect trap of claim 22 wherein
printed figures on the exterior of said side wall panels adjacent said perforations through said side wall panels are formed to represent structures which tend to be visually attractive to flying insects.

* * * * *